US011680377B2

(12) United States Patent
Hess

(10) Patent No.: US 11,680,377 B2
(45) Date of Patent: Jun. 20, 2023

(54) MECHANICALLY EXPANDABLE AND COLLAPSIBLE TRAFFIC WARNING DEVICE

(71) Applicant: Andrew Justin Hess, Mount Joy, PA (US)

(72) Inventor: Andrew Justin Hess, Mount Joy, PA (US)

(73) Assignee: Andrew Justin Hess, Mount Joy, PA (US)

( * ) Notice: Subject to any disclaimer, the term of this patent is extended or adjusted under 35 U.S.C. 154(b) by 141 days.

(21) Appl. No.: 17/207,778

(22) Filed: Mar. 22, 2021

(65) Prior Publication Data

US 2022/0298732 A1    Sep. 22, 2022

(51) Int. Cl.
*E01F 9/654* (2016.01)
*E01F 9/646* (2016.01)
*B60Q 7/00* (2006.01)

(52) U.S. Cl.
CPC .............. *E01F 9/654* (2016.02); *E01F 9/646* (2016.02); *B60Q 7/00* (2013.01)

(58) Field of Classification Search
CPC ............. E01F 9/654; E01F 9/646; B60Q 7/00
See application file for complete search history.

(56) References Cited

U.S. PATENT DOCUMENTS

| | | | | |
|---|---|---|---|---|
| 2,275,711 A * | 3/1942 | Ybanez | ................... | E01F 9/688 116/63 C |
| 2,954,005 A * | 9/1960 | Cioffi | ..................... | E01F 9/688 116/63 C |
| 3,132,624 A * | 5/1964 | Shoemaker, Jr. | ........ | E01F 9/617 428/690 |
| 3,426,343 A * | 2/1969 | Carlson | .................... | B60Q 7/00 362/186 |
| 3,496,904 A * | 2/1970 | Rimkus | ................... | E01F 9/654 D10/113.2 |
| 3,520,235 A | 7/1970 | Palazzolo | | |

(Continued)

OTHER PUBLICATIONS

Cao, "An Adjustable Traffic Safety Cone for Highway", Apr. 2022. (Year: 2022).*

*Primary Examiner* — John Fitzgerald
*Assistant Examiner* — Tania Courson

(57) ABSTRACT

The present invention relates to a mechanically expandable and collapsible traffic warning device safety marker comprising a base member, a controllable linear motion machine assembly and a battery with its connecting components which are contained within the base member, a collapsible body member, and an actuator switch member. The controllable linear motion machine assembly is controlled by an actuator switch member that enables the collapsible body member to mechanically collapse and expand upon user interaction. The controllable linear motion machine assembly mechanically retracts the collapsible body member to a nested position within the base member for compaction upon the user pressing the actuator switch member resulting in the mechanically expandable and collapsible traffic warning device safety marker to be easily stored within a compartment of a vehicle and mechanically expanding the expandable and collapsible body member conveniently to a ready for application condition.

1 Claim, 3 Drawing Sheets

(56) References Cited

U.S. PATENT DOCUMENTS

| | | | |
|---|---|---|---|
| 3,618,556 A | 11/1971 | Dittrich | |
| 3,707,320 A | 12/1972 | Brynes | |
| 4,006,702 A | 2/1977 | Cyr | |
| 4,197,607 A | 4/1980 | Campbell | |
| 4,256,050 A * | 3/1981 | Barnard | E01F 9/654 |
| | | | 116/63 P |
| 4,973,189 A * | 11/1990 | Bechtold | E01F 15/003 |
| | | | 220/8 |
| 5,305,705 A * | 4/1994 | Gagliano | E01F 9/688 |
| | | | 116/63 P |
| 6,338,311 B1 * | 1/2002 | Ho | E01F 9/688 |
| | | | 116/63 C |
| 6,928,952 B2 * | 8/2005 | Garcia | E01F 9/654 |
| | | | 116/63 P |
| 6,971,329 B1 * | 12/2005 | Stewart | E01F 13/028 |
| | | | 116/63 P |
| 7,571,693 B2 | 8/2009 | Tipaldo | |
| 7,766,386 B2 * | 8/2010 | Spingler | F16F 7/125 |
| | | | 280/751 |
| 7,914,168 B2 * | 3/2011 | Oliva | A47G 33/06 |
| | | | 362/123 |
| 8,442,750 B1 * | 5/2013 | Tran | G08G 1/04 |
| | | | 340/905 |
| 8,816,882 B2 * | 8/2014 | Boedeker | B64F 1/20 |
| | | | 340/953 |
| 10,329,721 B2 * | 6/2019 | Xie | E01F 9/654 |
| 10,997,856 B2 * | 5/2021 | Lykkja | G08G 1/096758 |
| 2004/0237875 A1 * | 12/2004 | Garcia | E01F 9/654 |
| | | | 116/63 C |
| 2006/0219153 A1 * | 10/2006 | Tipaldo | E01F 9/688 |
| | | | 116/63 C |
| 2009/0260562 A1 * | 10/2009 | Folstad | E01F 9/654 |
| | | | 116/28 R |
| 2014/0230719 A1 * | 8/2014 | Thomas | E01F 9/654 |
| | | | 116/63 C |
| 2016/0348325 A1 * | 12/2016 | Chi | A63K 3/00 |
| 2018/0327984 A1 * | 11/2018 | Xie | E01F 9/688 |

* cited by examiner

US 11,680,377 B2

MECHANICALLY EXPANDABLE AND COLLAPSIBLE TRAFFIC WARNING DEVICE

TECHNICAL FIELD

The present invention is categorized within the technical field of road traffic pylon safety and relates to an expandable and collapsible traffic warning device safety marker.

BACKGROUND OF THE INVENTION

The present invention relates to devices used to alert motorists to the existence of disabled vehicles or work zone areas. The volume of traffic incrementally increases each year resulting in a dangerous surrounding for occupants of disabled vehicles and personnel within a work zone. Many accidents that occur annually may have been prevented if oncoming motorists were alerted by a traffic warning device safety marker to the existence of disabled vehicles situated alongside the roadway. A variety of traffic warning device safety markers have become known over the years. Descriptions of such prior art of traffic warning devices are referenced in U.S. Pat. Nos. 3,618,556, 3,707,320, 4,197,607, 3,520,235, 4,006,702, 4,256,050, 5,305,705, 7,571,693, and 10,329,721.

An issue with respect to conveniently storing traffic warning devices in vehicles had prompted several attempts to provide an expandable and collapsible traffic warning device safety marker that can be condensed in size to reduce the required space for stowing in vehicles. Designs have ranged in many varieties, for example in U.S. Pat. Nos. 3,616,556 and 3,707,320, whereby the device's body is inflatable with air and attached to a base. Other designs have utilized coils or springs within its collapsible body, for example in U.S. Pat. No. 4,197,607 where a bolt mechanism to retain a condensed position and extending the conical body vertically once the spiral coil is released, and another variation in U.S. Pat. No. 3,520,235 which has a two-piece center module that requires assembly prior to use.

Other coil and spring variations are outlined in U.S. Pat. Nos. 4,006,702, 4,256,050, and 5,305,705. In other designs a folding mechanism is employed to collapse and expand the device's body such as outlined in U.S. Pat. Nos. 7,571,693 and 10,329,721.

Although prior art of traffic warning device safety markers provided designs for condensed traffic pylons, an inconvenience remains for the motorist to manually perform the task of expanding the traffic warning device's body which can be a frustrating and time-consuming endeavor when their attention is needed in solving the problem associated with their disabled vehicle alongside the roadway.

Furthermore, it has been a longstanding recognized problem as a safety concern in which many unnecessary fatalities and injuries resume annually related to incidents occurring with the presence of disabled vehicles alongside the roadway where traffic warning device safety markers may have aided in better visibility of motorists by oncoming traffic whereby a traffic warning device safety marker that is more convenient to store and deploy may further encourage its use by motorists during these hazardous situations.

SUMMARY OF THE INVENTION

Accordingly, the object of the present invention is to provide a traffic warning device safety marker that has a mechanically collapsible and expandable body member by employing a controllable linear motion machine assembly to perform the work within the traffic warning device safety marker, hence, achieving a condensed condition for the apparatus to occupy a minimum storage space when it is in a fully collapsed condition while eliminating the requirement inherent in other designs for exerting manual effort to expand and collapse the device's body member.

As such, the present invention offers an improvement over prior art as the traffic warning device safety marker's expandable and collapsible body member will conveniently expand and collapse mechanically by employing a controllable linear motion machine assembly upon the user's interaction with an actuator switch member whereby eliminating the requirement of the user to manually expand and collapse the device's body which may be more attractive to motorists and further encourage its use during hazardous situations.

BRIEF DESCRIPTION OF THE DRAWINGS

The above and other objects and advantages of the present invention will be more apparent from the following detailed description of the preferred embodiment taken in conjunction with the accompanying drawings of the preferred embodiment, in which.

DETAILED DESCRIPTION OF THE PREFERRED EMBODIMENT

Figure 1:
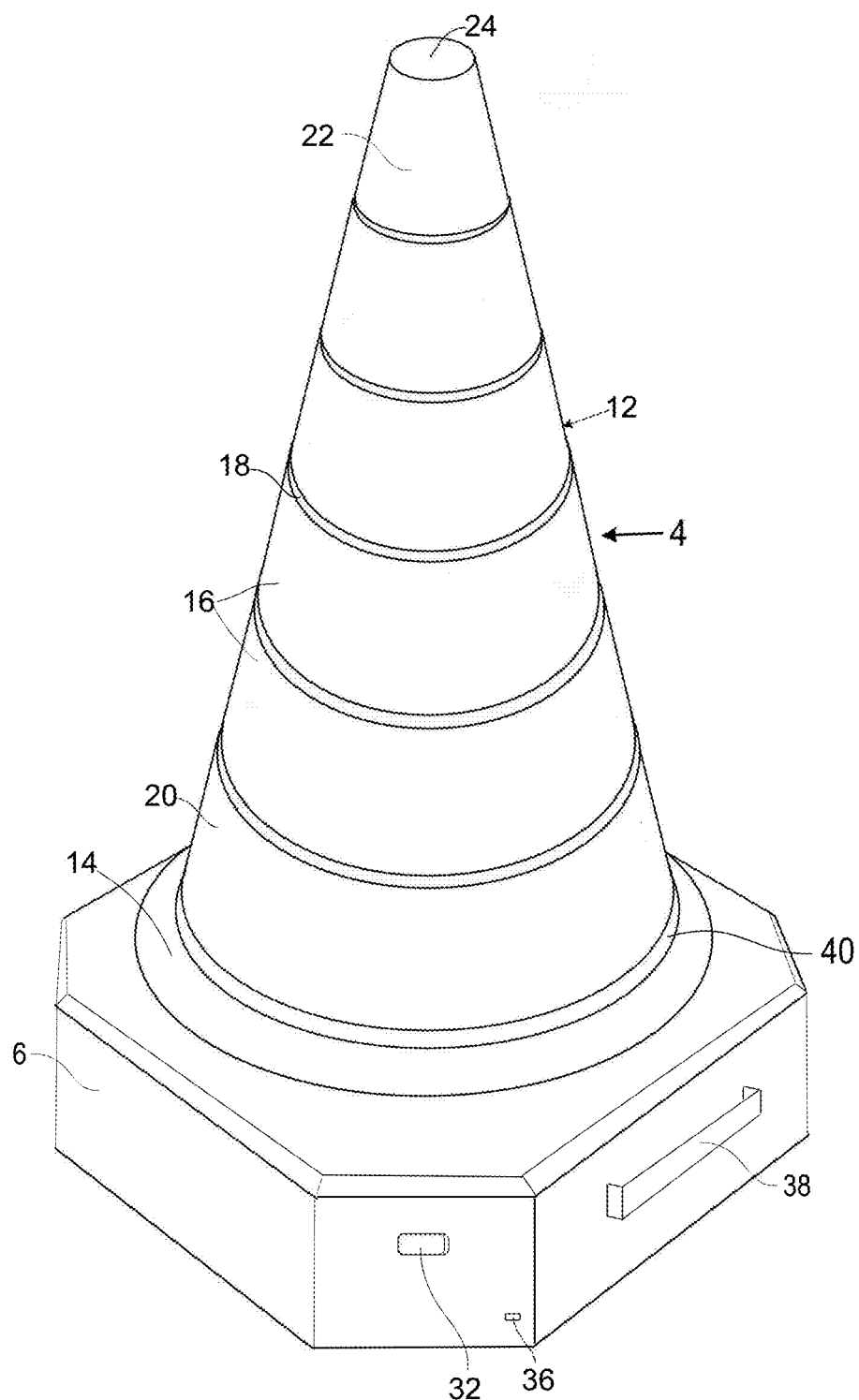
FIG. 1 is a diagram of a perspective view of the present invention in the expanded and ready for application condition according to the preferred embodiment of the present invention.

A preferred embodiment of the present invention will be described with reference to the associated drawings and several distinct elements are designated by the same reference numerals among all drawings when possible although different views may not show all components described hereinafter. The present invention will be described in several elements of which when integrated as described herein will enable one of ordinary skill in the art to made and use the present invention.

Referring to the drawings now wherein like reference numerals refer to like components throughout the various drawings reference numeral 4 is generally directed to the preferred conical shaped embodiment of the mechanically expandable and collapsible traffic safety warning device safety marker according to the present invention. In the preferred embodiment, it is evident the body is constructed in a shape of a cone as illustrated in FIGS. 1 and 3 herein; however, it may be structured in other shapes such as cylindrical round, rectangular, cylindrical square among other geometric configuration variations.

Figure 2:
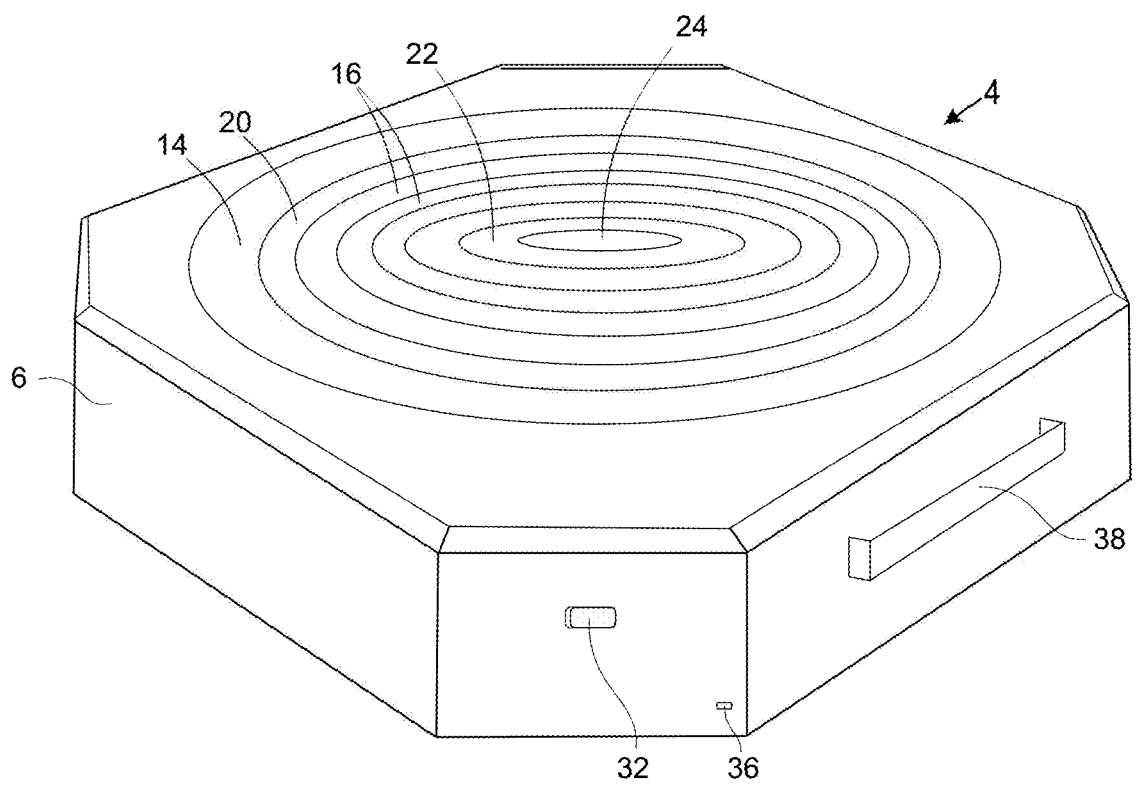
FIG. 2 is a perspective view of the present invention in the collapsed and closed condition for occupying minimal storage space according to the preferred embodiment of the present invention.
Figure 3:
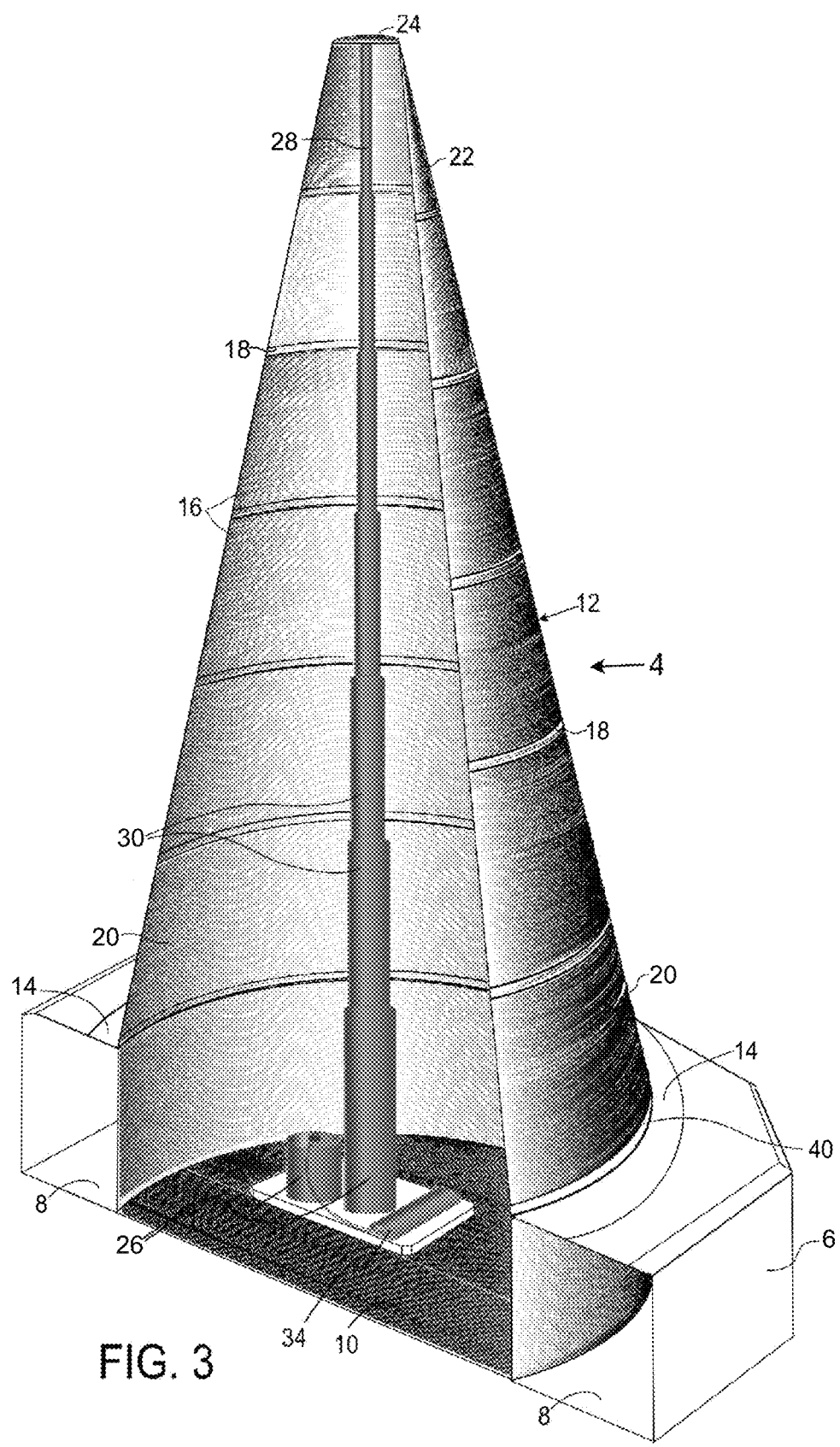
FIG. 3 is a perspective cross-sectional view of the present invention illustrating the internal construction comprising a rechargeable battery and a battery-powered telescopic linear actuator which each are contained within the inner compartment member of the weighted base member, an outer compartment member of the weighted base member containing the weighted material, a series of vertical riser members that are collapsible into the inner compartment member of the weighted base member and are displayed in the expanded and ready for application condition according to the preferred embodiment of the present invention.

In the preferred embodiment and referring to the drawings, there is shown generally at 4 a mechanically expandable and collapsible traffic warning device safety marker comprising a conical shaped body member consisting of a plurality of truncated hollow vertical riser members 16 which telescope vertically by employing the use of a battery-powered telescopic linear actuator 26 of which retracts each vertical riser member 16 into a nested position when not in use as illustrated in FIG. 2 and expands each vertical riser member 16 upwardly into a fixed extended position perpendicular to the weighted base member 6 when in use as shown in FIGS. 1 and 3. The collapsible body member 12 is connected to the weighted base member 6 by a joining linkage member 14 that is attached to the lower vertical riser member 20 and the top side of the weighted base member 6 at their adjacent edges such that the joining linkage member 14 which is disposed in the interstice of the body member 12 and weighted base member 6 connects each component together.

Referring particularly to the preferred embodiment illustrated in drawings, the traffic warning device safety marker 4 assembly comprises a weighted base member 6, a collapsible body member 12, a telescopic linear actuator member 26, and a rechargeable battery 34. The height of the traffic warning device safety marker 4 can be any variation; however, in the preferred embodiment, it will preferably align with the height that satisfies the standards set forth by the Manual on Uniform Traffic Control Devices for high-speed roadways as the best mode for application. The dimensions of the weighted base member 6 will be proportionate to the height of the traffic warning device safety marker 4 such that it is designed to help the traffic warning device safety marker 4 to resist displacement under high wind forces. Presently, the preferred embodiment, for an example, has a total height of 28 inches from the bottom of the weighted base member 6 to the apex 24 of the collapsible body member 12 and a width of 14 inches for all four sides of the weighted base member 6; however, the height and width of the device can be any variation to satisfy the object of resisting displacement under high wind forces in other embodiments.

In the present invention of the preferred embodiment, the truncated hollow vertical riser members 16 are designed to fit inside of each other as to nest compactly within the inner compartment member 10 of the weighted base member 6 when retracted whereas the lower vertical riser member 20 is connected to the weighted base member 6 by a joining linkage member 14 that attaches the collapsible body member 12 to the weighted base member 6 whereby the series of vertical riser members 16 expand out of the nested flat position from inside the inner compartment member 10 of the weighted base member 6 to a fully vertically expanded position by the employment of a battery-powered telescopic linear actuator assembly 26 which is situated in the center of the inner compartment member 10 of the weighted base member 6. In the preferred embodiment, the vertical riser members 16 are described as forming a conical shape when expanded as shown in FIGS. 1 and 3 and retract to a flat collapsed condition as illustrated in FIG. 2.

In the preferred embodiment, the collapsible body member 12 is comprised of a plurality of truncated hollow vertical riser members 16 each having an equal length that are of conical shape but may be trapezoidal, rectangular, square, or other geometric configuration variations as referred and are designed of ever decreasing radius and circumference from the lower to the upper vertical riser members 16 so that the upper most vertical riser members nest within the adjacent lower vertical riser members when retracted downwardly to the extent that they collapse within the opening of the base member 6 and nest in the designated configured space of the inner compartment member 10 resulting in an effectively flat position when not in use for compaction to be stored more easily. The number of truncated hollow vertical riser members 16 employed depends on the configured size of the traffic warning device safety marker 4 to the extent that all vertical riser members 16 are having substantially equal length to properly fit inside of each other when nested within the inner compartment member 10 of the weighted base member 6. Contained between the lower vertical riser member 20 and upper vertical riser member 22 are a series of middle vertical riser members capable of extending upwardly into an expanded fixed position when the upper vertical riser member 22 is extended to the maximum height through the mechanical force exerted by the telescopic linear actuator 26.

In the preferred embodiment, the upper vertical riser member 22 is connected to the top of the upper telescopic linear actuator segment member 28 that allows for the lifting of the lower, middle, and upper vertical riser members when the designated directional actuator switch member 32 is initiated by the user and the retraction of the vertical riser members 16 when the user initiates the designated directional actuator switch member 32 to effectively condense the collapsible body member 12 for compaction when not in use. When the device is not in use, it will be understood that by pressing the directional actuator switch member to the intended function of condensing the collapsible body member 12, the series of vertical riser members 16 will retract downwardly into the inner compartment member 10 of the weighted base member 6 resulting in a condensed condition as illustrated in FIG. 2. It will be understood that by pressing the directional actuator switch member 32 to the intended function of expanding the collapsible body member 12, the vertical riser members 16 will expand upwardly out of the inner compartment member 10 of the weighted base member 6 resulting in an expanded condition ready for use as illustrated in FIGS. 1 and 3.

In the preferred embodiment, the truncated hollow vertical riser members 16 are constructed of a durable plastic material such as thermoplastic which is light weight, strong, heat resistant, easily moldable, recyclable, and preferably sourced from recycled products for environmental benefits but may be made of rubber, metal, or other materials having certain rigidity. The apex of the upper vertical riser member 24 is a sealed solid, flat, and waterproof surface contiguous with the top exterior surface of the upper vertical riser member 22 made of the same material as the vertical riser members 16 and is designed to prevent external elements and debris from accessing the internal construction of the traffic warning device safety marker 4.

In the preferred embodiment, the vertical riser members 16 are of vivid orange color commonly known as "dayglo" orange to be visible in the daytime but are not limited thereto. Conceptually, the collapsible body member 12 is preferably colored with luminescent, fluorescent, or reflecting material for better visibility. The vertical riser members 16 have been designed so that reflective decals or reflective collars can be affixed in various spacing to further enhance the visibility to motorists especially at night when the collapsible body member 12 is met by beams from a vehicle's headlights but may include various reflective paints during the molding process of the vertical riser members 16 to provide stripes or other patterns in accordance with traffic control design standards among other variations.

Referring to the drawings and in the preferred embodiment, elastic segment members 18 are situated in the interstice of each vertical riser member 16 and are adhesively attached to the vertical ends of the adjacent vertical riser members 16 such that they form a linkage between each vertical riser member 16. The elastic segment members 18 are made of an elastically deformable and waterproof material such as silicon that accommodatively flexes when the vertical riser members 16 retract and expand to provide a strong adhesive linkage between each adjacent vertical riser member 16 and a watertight seal. The material used to construct the elastic segment members 18 can be selected from but are not limited to an elastically deformable silicon or other plastic materials as these materials have better flexibility, plasticity, and strength; however, may be made of other materials that provide a durable flexibility and a watertight seal in other embodiments.

In the preferred embodiment and referring to the drawings, the lower elastic segment member 40 is secured to the lower vertical riser member's 20 bottom end and attached to the upper end of the joining linkage member 14. The linkage member 14 is attached to the top exterior surface of the weighted base member 6 providing the joining of the collapsible body member 12 and the weighted base member 6. In the preferred embodiment, the joining linkage member 14 is constructed of a rubber material to provide flexibility and durability during the retraction of the vertical riser members 16 into the weighted base member 6 but is not limited to and may be made of elastically deformable silicon or other durable and flexible materials in other embodiments. FIGS. 1 and 3 illustrate the present invention and preferred embodiment of the traffic warning device safety marker 4 in the open and expanded condition, showing the lower, middle, and upper conical shaped truncated hollow vertical riser members 16 in their fully expanded and ready to use condition. In other embodiments, the collapsible body member 12 comprises a hollow, single accordion pleated member of conical shape or other geometric configuration variations and made of flexible material such as rubber, plastic, or the like suitable for elastically deforming into a collapsed condition.

Referring to the drawings and in the preferred embodiment, the weighted base member 6 is provided which is preferably square with angled corners whereby it has a plurality of corners and a height configured to accommodate the components contained within the weighted base member 6 but may be any other convenient geometric three-dimensional configuration such as octagon, square with rounded corners, or hexagon shaped as examples but is not limit to and is provided with a large opening on the upper side of the weighted base member 6 of which is configured to leave space to receive the collapsible vertical riser members 16 within an inner compartment member 10 of the weight base member 6 such that the collapsible body member 12 may be contained within.

Referring to the drawings and in the preferred embodiment, the center opening of the inner compartment member 10 of the weighted base member 6 extends inwardly and upwardly along a straight line providing sufficient space to accommodate for all internal components and the collapsible body member 12. Even though the cone device is light weight in its collapsible body member 12, the concentration of weight is in the weighted base member 6 of which includes an outer compartment member 8 positioned on the outer section of the weighted base member 6 and surrounding the inner compartment member 10. The outer compartment member 8 is configured for storing weighted material such as sand, water, or steel as examples but may consist of any suitable densely weighted material designed to provide the necessary weight for the device to withstand and remain secure during high wind loads.

In the preferred embodiment, the weighted base member 6 is constructed of crumb rubber because of its relatively high weight density but may be made of plastic such as thermoplastic or any other durable and suitable material. The size and weight of the weighted base member 6 is calculated to enable the device to sufficiently resist displacement under high wind forces.

In the preferred embodiment, the weighted base member 6 is black in color as it is less costly for the rubber material to maintain its native color than to dye it with other colors but is not limited to and may be made of any color variation in other embodiments. Referring to FIGS. 1 and 2 and in the preferred embodiment, the weighted base member 6 incorporates a carrying handle 38 that is externally secured to one side of the weighted base member 6 for enabling the user to conveniently carry the traffic warning device safety marker 4 while in its collapsed condition but may comprise more than one handle and disposed in various configurations and positions in other embodiments.

The carrying handle 38 is preferably an elongated strap made of thermoplastic but is not limited to and may be constructed from other durable material suited for sustaining the weight of the device and other types of handles in other embodiments.

Referring to FIG. 3 and in the preferred embodiment of the present invention, the weighted base member 6 contains a controllable linear motion machine assembly 26 to perform the work within the traffic warning device safety marker 4, preferably a telescopic linear actuator assembly 26 as illustrated, that is positioned in the center of the inner compartment member 10 and is connected to a rechargeable battery 32 for powering the mechanical retraction and expansion of the truncated hollow vertical riser members 16 into and out of the weighted base member 6. The telescopic linear actuator assembly 26 comprises a plurality of segment members 30 that are each substantially equal in length and telescope in alignment with the truncated hollow vertical riser members 16 at each elastic segment member 18 position whereby they move in tandem when the vertical riser members 16 retract downwardly and expand upwardly. The telescopic linear actuator assembly 26 and its configurations are not limited to the type and arrangement as described in the preferred embodiment but may be of other variations of controllable linear motion machine assemblies and configurations in other embodiments.

Referring to FIGS. 1 and 2 in the drawings and in the preferred embodiment, a waterproof non-momentary actuator double pole double throw (DPDT) rocker switch member 32 to be referred to hereinafter as "actuator switch member" 32 is positioned on one external side of the weighted base member 6 and is used to control the function of employing the telescopic linear actuator assembly 26 when the user interacts with it by pressing the directional end whereby one end of the actuator switch member 32 is designated for the telescopic linear actuator member 26 to expand the vertical riser members 16 upwardly and the opposite end of the actuator switch member 32 is designated for the retraction of the vertical riser members 16 downwardly. Therefore, it is understood that the actuator switch member 32 incorporates the mechanisms to initiate the telescopic linear actuator assembly 26 to expand and retract its segment members 30 in tandem with the series of vertical riser members 16.

In the preferred embodiment, the user presses the left end portion of the actuator switch member 32 to initiate the telescopic linear actuator assembly 26 to expand its segment members 30 and vertical riser members 16 upwardly to a ready for use condition and the user presses the right end portion of the actuator switch member 32 to initiate the telescopic linear actuator assembly 26 to retract its segment members 30 and vertical riser members 16 into the condensed condition within the inner compartment member 10 for easily storing the traffic warning device safety marker 4. The actuator switch member 32 is not limited to the type and configuration as described in the preferred embodiment and may employ a toggle actuator switch or momentary actuator switch for examples among a variety of other types of switches and their assemblies and may be arranged in various positions of the traffic warning device safety marker 4 in other embodiments.

In the preferred embodiment and referring to FIG. 3, the top surface of the upper segment member 28 of the telescopic linear actuator assembly 26 is attached internally to the bottom surface of the apex 24 of the upper vertical riser member 22 resulting in the unified connection between the telescopic linear actuator assembly 26 and the series of vertical riser members 16 whereby mechanically expanding the series of vertical riser members 16 from a condensed condition to an expanded condition upwardly and perpendicular to the weighted base member 6 when in use as illustrated in FIGS. 1 and 3. It will mechanically retract the vertical riser members 16 to a collapsed condensed condition when not in use as illustrated in FIG. 2.

As illustrated in FIGS. 1 and 3, and in the preferred embodiment, the traffic warning device safety marker 4 is displayed in its expanded and ready to use condition. As seen in FIG. 2 and in the preferred embodiment, the traffic warning device safety marker 4 is displayed in its collapsed condensed condition for easily carrying using the carrying handle 38 and storing within the user's vehicle.

Referring to FIG. 3 and in the preferred embodiment, the present invention is displayed in a cross-sectional perspective view while in the expanded and ready for application condition and illustrates the truncated hollow vertical riser members 16 in which the upper vertical riser member 22 is attached to the upper segment member 28 of the telescopic linear actuator 26 for the means of mechanically retracting and expanding the series of truncated hollow vertical riser members 16. Additionally, the internal construction of the weighted base member 6 is displayed in FIG. 3 which illustrates the configured open space in the inner compartment member 10 of the weighted base member 6 that accommodates for receiving the truncated hollow vertical riser members 16 and houses the telescopic linear actuator assembly 26 and the rechargeable battery 34 with its connecting and recharging components. Referring to FIG. 3 and in the preferred embodiment is illustrated the outer compartment member 8 which is configured to store the weighted material to help the traffic warning device safety marker 4 resist displacement under high wind forces.

Referring to FIGS. 1 and 2 and in the preferred embodiment, the weighted base member 6 comprises a USB charging port 36 positioned exteriorly on one side of the weighted base member 6 for charging the rechargeable battery 34 by plugging the USB cord into the USB charging port 36 and the USB wall charger outlet adapter for common electrical receptacles but is not limited to and may be made of the components for a common AC power cord and charging port as an example or other variations of charging ports and adapters in other embodiments. In the preferred embodiment, a rechargeable battery 34 is the exclusive source of power for employing the telescopic linear actuator 26 but is not limited to and may be made of a solar power system in conjunction with the use of a rechargeable battery powering system or as a singular source of powering the telescopic linear actuator assembly 26 among various other powering sources and combinations in other embodiments.

The mechanically expandable and collapsible traffic warning device safety marker 4 has been designed for easy placement and use during emergency situations. In the preferred embodiment, to deploy the present invention, the user simply places the traffic warning device safety marker 4 at desired location while in the assembly's condensed condition as illustrated in FIG. 2 and then initiate the power for employing the telescopic linear actuator assembly 26 by pressing the left end portion of the actuator switch member 32 which will expand the telescopic linear actuator segment members 30 upwardly from a retracted and nested condition in tandem with the series of the lower, middle, and upper conical shaped truncated hollow vertical riser members 16 that comprise the collapsible body member 12 resulting in a ready for use condition as illustrated in FIGS. 1 and 3. To return the collapsible body member 12 to a condensed and closed condition, the user will press the right end portion of actuator switch member 32 which initiates the telescopic linear actuator 26 to retract the telescopic linear actuator segment members 30 in tandem with the truncated hollow vertical riser members 16 into a nested position within the inner compartment member 10 of the weighted base member 6 and is ready for the user to stow.

What is claimed is:

1. A mechanically expandable and collapsible traffic warning device safety marker comprising:
    (a) a base member of any convenient three-dimensional geometric configuration having an open top face and an internal compartment configured to receive a collapsible body member, a controllable mechanical linear motion assembly, and a battery member
    (b) said collapsible body member comprising a series of at least two hollow vertical riser members that are substantially equal in length constructed of hard material with the apex of the top vertical riser member being solid and at least one elastic segment member that is made of elastically deformable material disposed in the interstice of each hollow vertical riser member and attached to the edges of each adjacent hollow vertical riser member wherein flex upon the hollow vertical riser members mechanically collapsing downwardly into a nested condensed condition within said base member's internal compartment and upon the hollow vertical riser members mechanically expanding upwardly into an extended vertical configuration condition perpendicular to said base member actuated mechanically by said controllable mechanical linear motion assembly
    (c) said controllable mechanical linear motion assembly contained within the bottom center of said base member's internal compartment with a plurality of movable segment members having at least one surface that engages said collapsible body member and mechanically expands and retracts said collapsible body member perpendicularly to said base member in response to user interaction with an actuator switch member and provides the means for structural stability of said collapsible body member (d) said battery member and its connecting components are contained in said base member's internal compartment and provides power to said controllable mechanical linear motion assembly (e) said actuator switch member which is disposed at any convenient position of the exterior surface of said collapsible body member or said base member for initiating the power supply from said battery member to said controllable mechanical linear motion assembly upon user interaction, and (f) a battery charging port which is disposed at any convenient position of the exterior surface of said collapsible body member or said base member for recharging the said battery member that is contained in said base member's internal compartment, whereby said collapsible body member in response to user interaction with said actuator switch member will be mechanically condensed downwardly into a collapsed condition to occupy a minimum storage space and mechanically expanded upwardly into an extended condition ready for application.

\* \* \* \* \*